Dec. 8, 1936.  G. STAFFEL  2,063,768

INSECT TRAP

Filed Oct. 23, 1935

Gerald Staffel, INVENTOR

BY Victor J. Evans & Co.

ATTORNEY

Patented Dec. 8, 1936

2,063,768

UNITED STATES PATENT OFFICE 2,063,768

INSECT TRAP

Gerald Staffel, San Antonio, Tex.

Application October 23, 1935, Serial No. 46,426

1 Claim. (Cl. 43—131)

The invention relates to an insect trap and more especially to a baiting device for insects.

The primary object of the invention is the provision of a device of this character, wherein poisonous bait can be conveniently held for attracting insects including ants or the like and such device in its make-up can be readily placed outdoors or in the house and when outdoors beneath shrubs, fastened to trees or in other spots for attracting and trapping insects or the like.

Another object of the invention is the provision of a device of this character, wherein the construction thereof is novel in form in that it is susceptible of being reversed and is readily portable and assures safety in that the poisonous substance for attracting insects, ants or the like will be held out of reach of pets, children, etc.

A further object of the invention is the provision of a device of this character which is extremely simple in construction, thoroughly reliable and efficient in its purposes, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing.

Similar reference characters indicate corresponding parts throughout the several views in the drawing.

Figure 1:
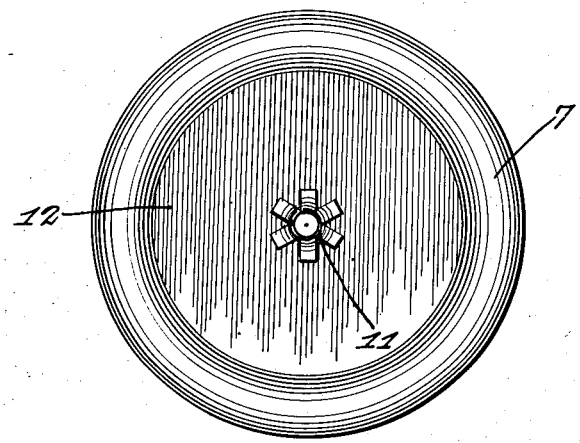
Figure 1 is a plan view of a device constructed in accordance with the invention.
Figure 2:
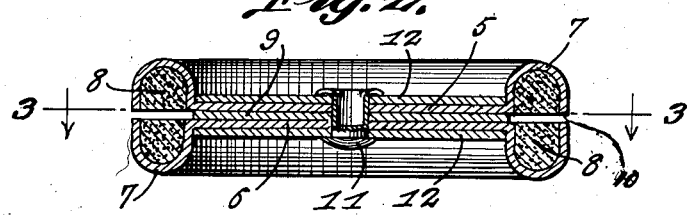
Figure 2 is a vertical sectional view through the same.
Figure 3:
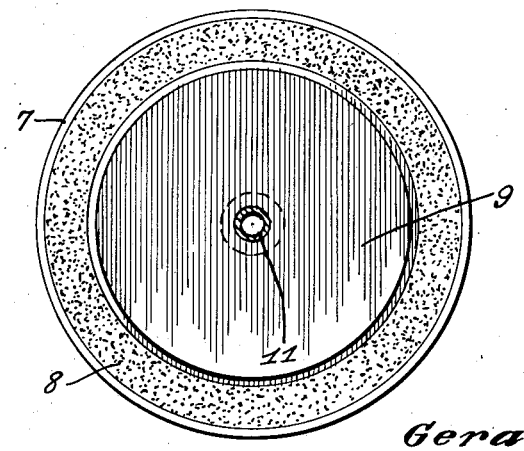
Figure 3 is a sectional view on the line 3—3 of Figure 2 looking in the direction of the arrows.

Referring to the drawing in detail, the device, which is in the nature of a trap for insects including ants or the like, comprises a pair of spaced circular members 5 and 6, these being made from relatively stiff fibrous material such as pasteboard and have their peripheral portions outstruck to provide annular grooves or channels 7, these confronting each other and are adapted to contain absorbent fillers 8 for poisonous substance of a kind to attract insects and ants or the like.

Interposed between the members 5 and 6 is a spacer disc 9 which separates the peripheral channeled or grooved portions 7 from each other to provide entrance passages 10 to the poisonous substance impregnating the fillers 8 and serving to attract insects, ants or the like for the killing of the same.

Centrally engaged through the members 5 and 6 and the spacer disc is a rivet or other fastener 11, it being also passed through outer retaining discs 12, these being disposed against the members 5 and 6 and lie within the indented areas thereof as effected by the peripheral or marginal grooved portions of said members.

The discs 9 and 12 are preferably made from fibrous sheet material such as stiff cardboard or the like and the poisonous substance of the selected kind is applied to the fillers 8 so that in the use of the device insects, ants or the like will be attracted thereto and will have entrance through the passage 10 for the killing of the same when crawling between the members.

The discs 12 can carry a suitable printed indicia or advertising matter and in the assembly of the device it is readily reversible and can be placed in restricted places, as, for example, outdoors beneath shrubs, attached to trees or otherwise set and indoors can be placed in corners for the trapping and killing of insects or the like.

When the device is used for trapping ants, it readily attracts them due to the material of which it is constructed in that the tendency is for ants to avoid glass or metal containers and also provides a dark, tight spot for the ants to crawl into while the fillers 8 may be substituted for a poisonous composition placed within the channels or grooves 7 for the filling thereof.

What is claimed is:

An insect trap comprising flat relatively thin disk-like members superposed relative to each other in matched relation one to the other and having peripheral portions outstruck to effect annular relatively deep half circular channels between said members, a spacer disk between the said members and having an outer peripheral edge extending to the outstruck peripheries of said members and holding the channel in one member spaced from the channel in the other member, external disks disposed against the said members and covering the same centrally thereof with respect to the outstruck peripheries and having their edges abutting the latter, a rivet uniting the members with the said disks, the space between the channels being continuous in an annular path and opening peripherally in a horizontal plane outwardly between said members, and poisonous substance within the channels and separated from each other to the extent of the space between the outstruck peripheral portions of said members throughout.

GERALD STAFFEL.